United States Patent
Wang et al.

[11] Patent Number: 6,132,846
[45] Date of Patent: Oct. 17, 2000

[54] METHOD FOR PRODUCING A PLASTIC TILE AND THE PRODUCT THEREOF

[76] Inventors: Cheng-Hsiung Wang, Kaohsiung; Yi-Chin Wang, Taipei, both of Taiwan

[21] Appl. No.: 09/141,638

[22] Filed: Aug. 26, 1998

[51] Int. Cl.⁷ ................................. B32B 3/00; B29B 7/00

[52] U.S. Cl. ................ 428/156; 428/141; 264/297.1; 264/328.1

[58] Field of Search ................................. 428/172, 148, 428/141, 518, 519, 522, 156, 49, 521, 542.2; 264/328.1, 297.1, 109, 119; 52/309.1, 316, 380, 389, 596

[56] References Cited

U.S. PATENT DOCUMENTS 4,393,108  7/1983  Barker et al. .............................. 428/44
5,059,474  10/1991  Yoshida .................................... 428/374

*Primary Examiner*—Donald Loney
*Attorney, Agent, or Firm*—Sheridan Ross P.C.

[57] ABSTRACT

A method for producing a plastic tile includes the steps of: preparing a molding material consisting essentially of a resinous powder, diatom powder, barium sulfate and organotin; and injection molding the molding material. The resinous powder contains, by weight, 60% of acrylonitrile butadiene styrene and 40% of polyvinyl chloride.

8 Claims, 3 Drawing Sheets

METHOD FOR PRODUCING A PLASTIC TILE AND THE PRODUCT THEREOF

BACKGROUND OF THE INVENTION

1. Field of the Invention

This invention relates to a method for producing a plastic tile and the product thereof.

2. Description of the Related Art

A conventional method for producing a plastic tile involves preparing a mixture of plastic powder, plasticizers, stabilizers, calcium carbonate, pigment powder and asbestos, pelletizing the mixture, extruding the pelletized-mixture in an extruder to form an extrusion product and cutting the extrusion product into plastic tiles of a predetermined size.

The conventional method for producing a plastic tile suffers from the following disadvantages:
1. Usually, a patterned layer is provided on the plastic tile in order to improve the appearance of the same. Accordingly, a process for attaching the patterned layer to the plastic tile is additionally necessary.
2. The mechanical strength of the plastic tiles that are produced from the aforementioned conventional method is poor. Therefore, the plastic tiles are subject to breakage when bent unintentionally.
3. The plastic tiles produced from the aforementioned conventional method are not fireproof.

SUMMARY OF THE INVENTION

The object of the present invention is to provide a method for producing a plastic tile in which a patterned layer can be formed on the plastic tile without the need for an additional attachment process.

Another object of the present invention is to provide a plastic tile that has a mechanical strength greater than that of the plastic tile in the aforementioned prior art.

Still another object of the present invention is to provide a plastic tile that is fireproof.

According to the present invention, the method for producing a plastic tile comprises the steps of: preparing a molding material consisting essentially of a resinous powder, diatom powder, barium sulfate and organo-tin; and injection molding the molding material. The resinous powder contains, by weight, 60% of acrylonitrile butadiene styrene and 40% of polyvinyl chloride.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
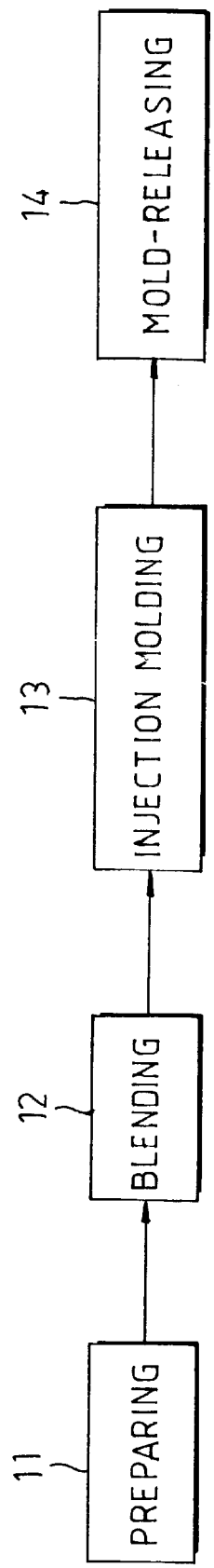
FIG. 1 is a flow diagram of a preferred embodiment of the method for producing a plastic tile according to the present invention.

Referring to FIG. 1, a preferred embodiment of the method for producing a plastic tile according to the present invention is shown to comprise the steps of preparing 11, blending 12, injection molding 13 and mold-releasing 14.

In the preparing step 11, a molding material is prepared. The molding material consists of, by weight, 58% of a resinous powder, 10% of diatom powder, 8% of barium sulfate, 6% of organo-tin, 2% of cadmium stearate, barium stearate and lead stearate, 5% of antimonous oxide, 10% of di-hexyl phthalate, and 1% of pigment powder. The resinous powder contains, by weight, 60% of acrylonitrile butadiene styrene and 40% of polyvinyl chloride.

In the blending step 12, the molding material is blended and made in to pellets. In the molding material, the function of the organo-tin is to improve the stability of the molding material while the function of the diatom powder and the barium sulfate is to provide toughness to the molding material. Moreover, the di-hexyl phthalate is in a liquid state and serves as a lubricant, thereby enhancing the mold-releasing property of the molding material. In addition, the antimonous oxide is used as a fire retardant agent.

Figure 3:
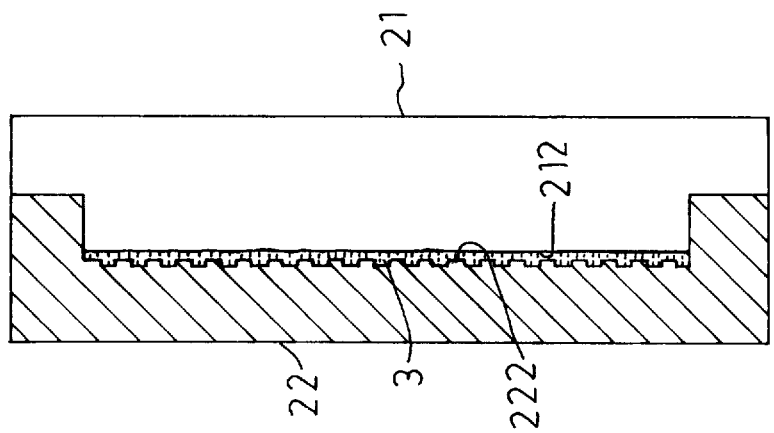
FIG. 3 is a schematic view illustrating the male and female molds of FIG. 2 being closed.
Figure 2:
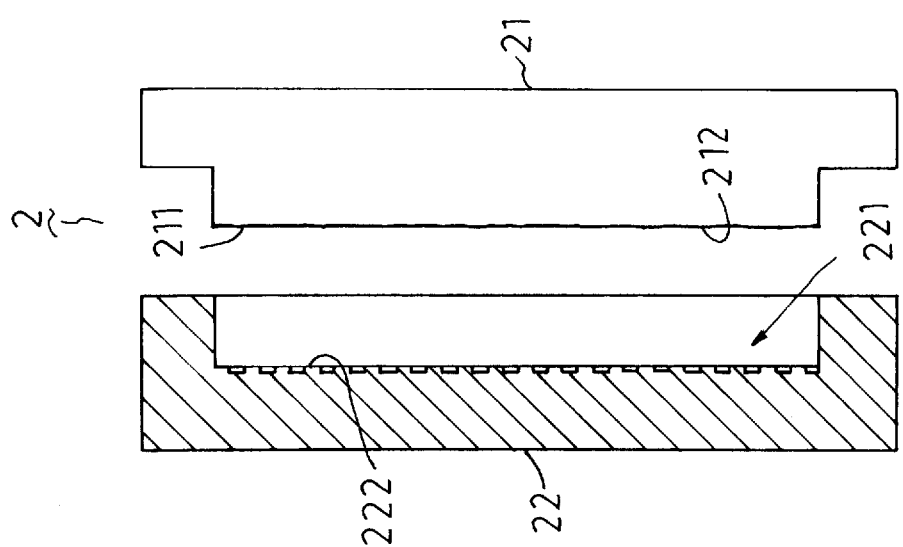
FIG. 2 is a sectional schematic view illustrating male and female molds for forming the plastic tile according to the method of the present invention.

In the injection molding step 13, the pellets are placed in an injection-molding machine (not shown) and are melted by the high temperature subjected thereto to form a molten molding material 3. The molten molding material 3 is then injected into a forming mold 2 that consists of complementary mating male and female molds 21, 22, as best illustrated in FIGS. 2 and 3. The male mold 21 has a projection 211 and the female mold 22 has a cavity 221 that can receive correspondingly the projection 211. The projection 211 of the male mold 21 has a flat face engraved with a predetermined pattern 212 and the cavity 221 of the female mold 22 has a bottom face formed with a plurality of spaced cylindrical protrusions 222. More specifically, the molten molding material 3 is injected into a space between the flat face of the male mold 21 first and the bottom face of the female mold 22.

Figure 4:
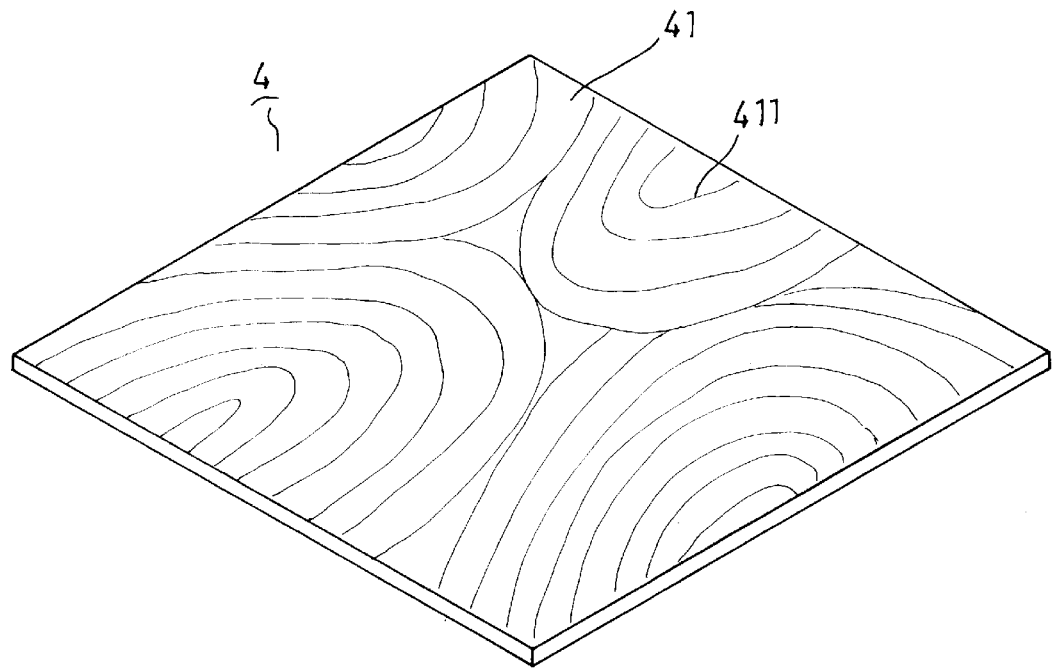
FIG. 4 is a perspective view illustrating the top face of a plastic tile according to the present invention.
Figure 5:
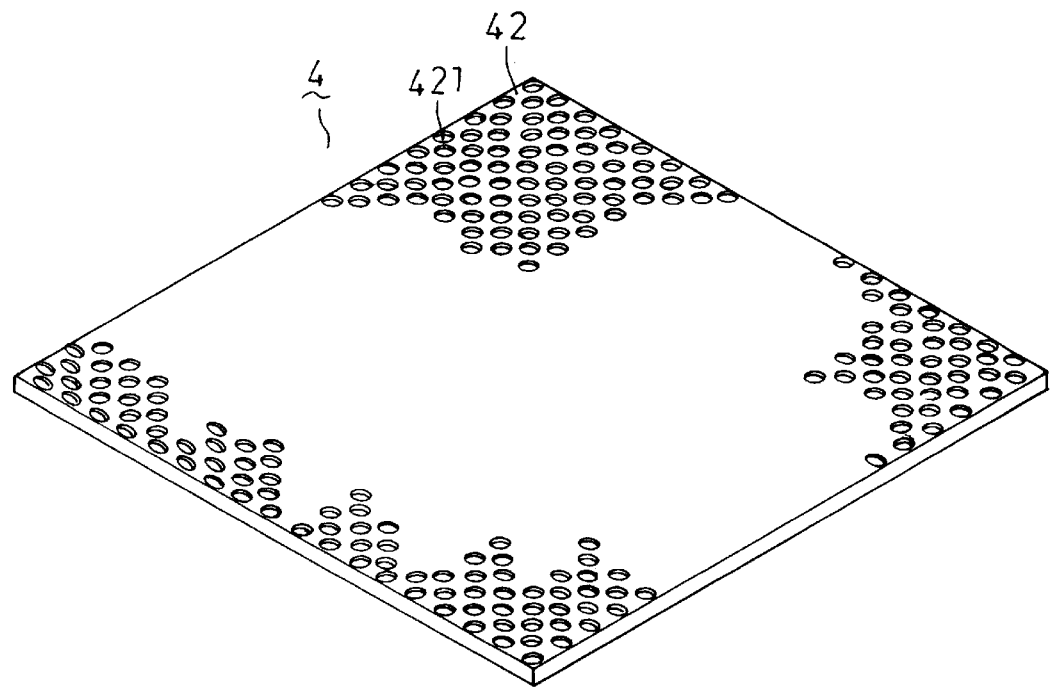
FIG. 5 is a perspective view of the bottom face of the plastic tile of FIG. 4.

Referring to FIGS. 4 and 5, after the molten molding material 3 is cooled and cured, a square plastic tile 4 is removed from the forming mold 2 in the mold-releasing step 14. The plastic tile 4 has opposed first and second faces 41, 42 that are formed with a pattern 411 correspondent to the predetermined pattern 212 on the male mold 21 and a plurality of circular depressions 421 correspondent to the protrusions 222 of the female mold 22, respectively.

The advantages of the method for producing the plastic tile according to the present invention are as follows:
1. A predetermined pattern 411 can be formed on the first face 41 of the plastic tile 4 without the need for an additional pattern attachment process. In addition, no cutting process is required during formation of the plastic tile. Therefore, the plastic tile 4 can be produced in a relatively simple and convenient manner.
2. Since the resinous powder contains acrylonitrile butadiene styrene and polyvinyl chloride that improves greatly the toughness and dimensional stability of the plastic tile 4, mechanical strength of the plastic tile 4 is greater than that of the plastic tile in the aforementioned prior art.
3. Since the molding material contains a fire retardant agent, the plastic tile 4 is fireproof.
4. Since the second face 42 of the plastic tile 4 is formed with a plurality of depressions 421, the adhesion force of the adhesive to be applied to the face 42 is enhanced, thereby resulting in a good adhesion between the plastic tile 4 and the surface to which the tile 4 is to be adhered.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for producing a plastic tile, comprising the steps of:

preparing a molding material consisting essentially of a resinous powder, diatom powder, barium sulfate and organo-tin powder, said resinous powder containing, by weight, 60% of acrylonitrile butadiene styrene and 40% of polyvinyl chloride; and injection molding said molding material.

2. The method as defined in claim 1, wherein said molding material further comprises cadmium stearate, barium stearate and lead stearate.

3. The method as defined in claim 2, wherein said molding material further comprises antimonous oxide.

4. The method as defined in claim 3, wherein said molding material further comprises di-hexyl phthalate.

5. The method as defined in claim 4, wherein said molding material further comprises pigment powder.

6. The method as defined in claim 5, wherein said molding material contains, by weight, 58% of said resinous powder, 10% of said diatom powder, 8% of barium sulfate, 6% of organo-tin powder, 2% of cadmium stearate, barium stearate and lead stearate, 5% of antimonous oxide, 10% of di-hexyl phthalate, and 1% of pigment powder.

7. A plastic tile produced according to the method of claim 1.

8. A plastic tile as defined in claim 7, comprising opposed first and second faces, said first face having a predetermined pattern formed thereon, said second face having a plurality of depressions formed thereon.

* * * * *